United States Patent [19]

Hammer

[11] 4,289,552
[45] Sep. 15, 1981

[54] METHOD FOR THE CONTINUOUS WELDING OF THERMOPLASTIC SHEETS

[75] Inventor: Heiner I. Hammer, Rosengarten, Fed. Rep. of Germany

[73] Assignee: GFA-Gesellschaft für Flächenabdichtung mit beschränkter Haftung, Garstedt, Fed. Rep. of Germany

[21] Appl. No.: 926,615

[22] Filed: Jul. 21, 1978

[30] Foreign Application Priority Data

Jul. 22, 1977 [ZA] South Africa ............ 77/4427

[51] Int. Cl.³ .................. B32B 31/16; B32B 31/30
[52] U.S. Cl. .................. 156/73.4; 156/157; 156/244.11; 156/244.22; 156/272; 156/292; 156/322; 156/499; 156/500; 156/574; 264/248; 264/DIG. 80; 427/256; 427/284; 428/57; 428/161; 428/177; 428/189; 428/198
[58] Field of Search ............ 2/275; 5/365, 368, 369; 156/73.4, 157, 244.11, 272, 292, 322, 499, 500, 574, 244.22; 264/248, 261, DIG. 80; 427/256, 284; 428/57, 161, 177, 189, 198

[56] References Cited

U.S. PATENT DOCUMENTS

| | | | |
|---|---|---|---|
| 3,008,862 | 11/1961 | Haine et al. | 156/308.4 X |
| 3,578,543 | 5/1971 | Cook et al. | 156/157 X |
| 3,700,520 | 10/1972 | Hielema | 428/189 X |
| 3,806,388 | 4/1974 | Contini | 156/184 |
| 3,962,016 | 6/1976 | Alfter et al. | 156/304 |
| 4,135,957 | 1/1979 | Voller | 156/157 |
| 4,200,676 | 4/1980 | Caponigro et al. | 428/57 |

Primary Examiner—Robert A. Dawson
Attorney, Agent, or Firm—Diller, Ramik & Wight

[57] ABSTRACT

A method of welding together a pair of thermoplastic sheets each including opposite surfaces bridged by a terminal edge defining an edge portion by placing the edge portion of a first overlapping of the pair of sheets into overlapping relationship with a second edge portion of a second overlap of the pair of sheets and with the terminal edges thereof spaced a predetermined distance from each other and in generally parallel relationship to each other, applying a continuous linear strip of plastic welding material in thermoplastic state progressively and in generally parallel relationship to the terminal edges along surfaces of the overlapping and overlapped edge portions and in bridging relationship to the terminal edge of the overlapping edge portion, performing the overlapping in the absence of overlapping any portion of the overlapping first sheet upon itself and in the absence of overlapping any portion of the overlapped sheet upon itself, and applying heat to those surfaces of the overlapped and overlapping edge portions through which the plastic welding material is applied prior to the application of the latter to the edge portions.

18 Claims, 9 Drawing Figures

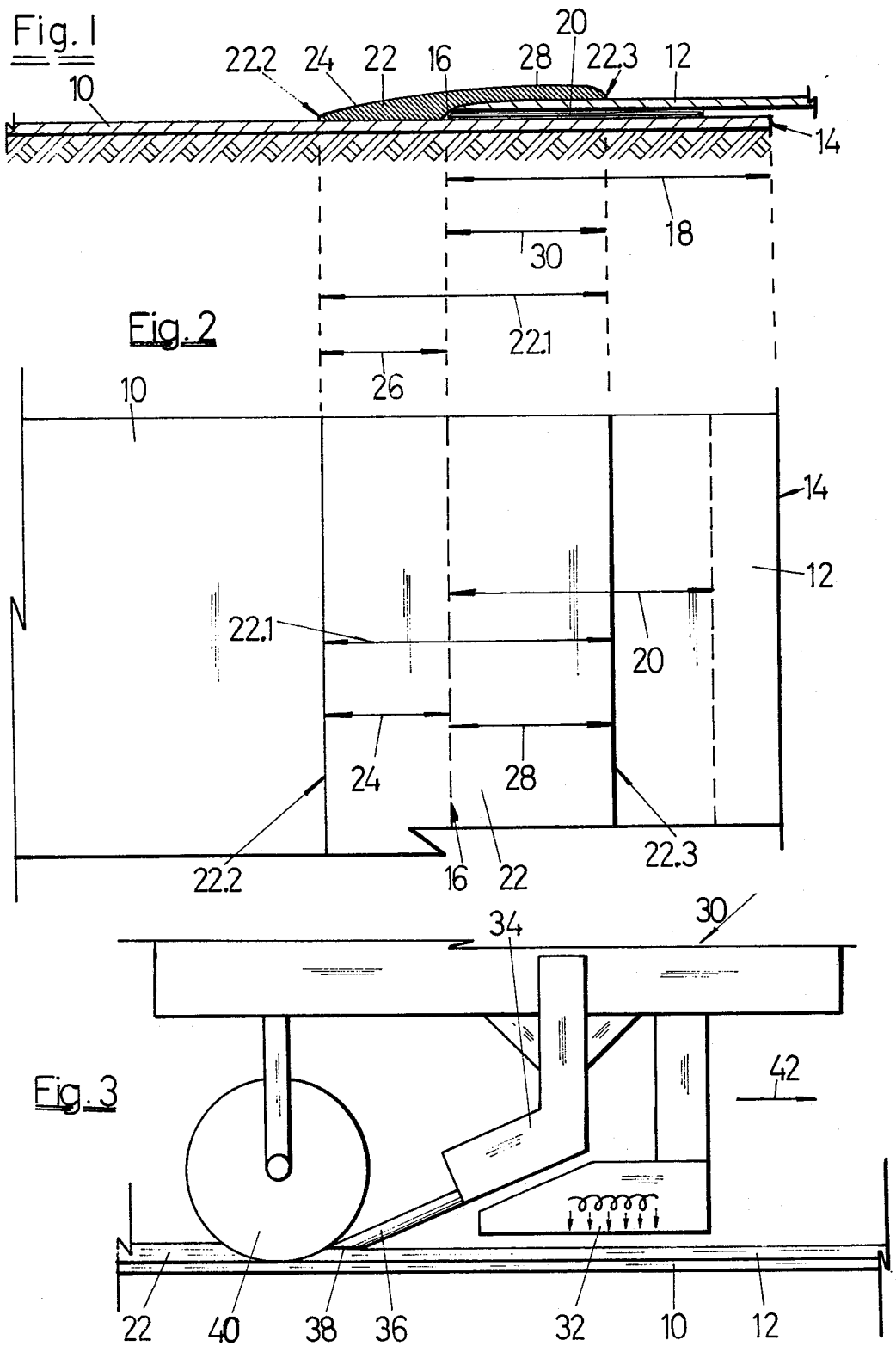

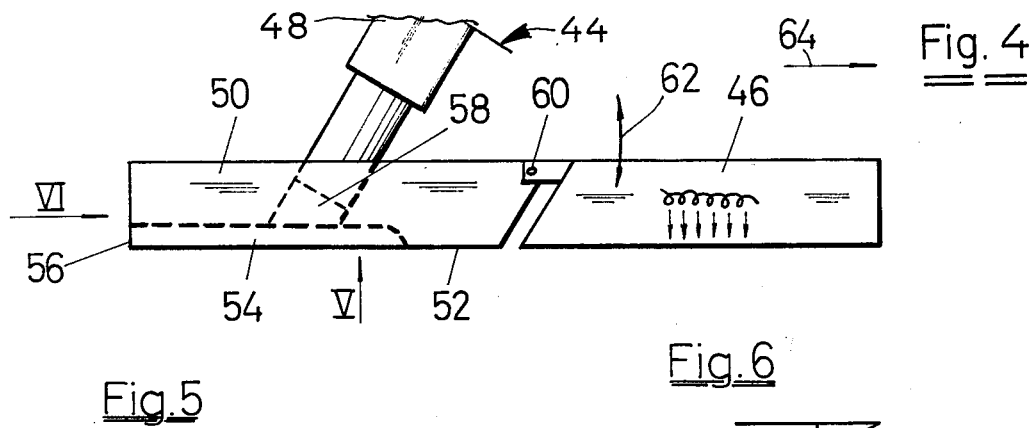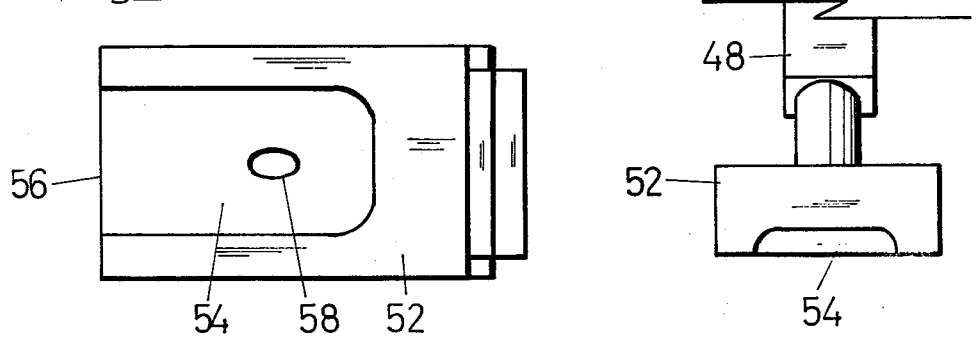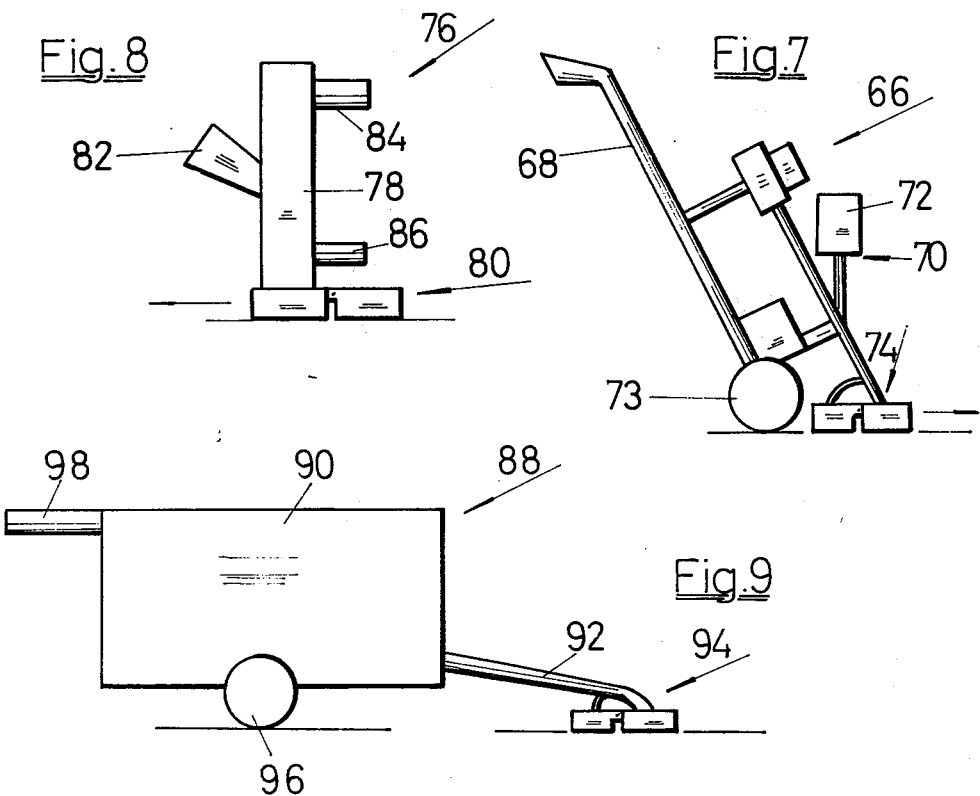

METHOD FOR THE CONTINUOUS WELDING OF THERMOPLASTIC SHEETS

The present invention relates to a method and apparatus for the continuous welding of thermoplastic sheets.

In the specification and claims hereinafter the expression "welding" also is to include the concepts of "sealing" and "joining".

Furthermore, the expression "thermoplastic sheets" is to include thermoplastic films, plates, foils and webs, which have a thickness rendering them suitable for the application of a method and apparatus in accordance with the invention.

The applicant knows that thermoplastic sheets, in particular for use in civil constructional work and in particular when placed on irregular earth surfaces or a sand bed, reveal problems during welding in that the heat, which is normally to be introduced for the creation of the thermoplastic condition at the welding areas, and the subsequent pressure cannot be produced uniformly so as to obtain a regular welding factor over the total longitudinal cross-section of the welding.

When using thermoplastic sheets for civil constructional work (e.g. storage dams, large containers) these often are to be welded together. In one welding method, the so-called "overlapping welding", a heating device is situated between the overlapping sheets, subsequently a thermoplastic strip from an extruder is introduced into between the overlapping surfaces of the sheets by means of a nozzle and thereafter the sheets are pressed together. This welding method is subject to various problems and disadvantages. For instance, due to the fact that the upper sheet permanently overlaps that surface part of the lower sheet, which is welded to it, different adhesion values occur during welding by virtue of the different temperature gradients. As the welding seam is closed off by the overlapping or upper sheet, it is difficult to inspect it and thereby to control the quality of the welding seam. Also due to the thorough heating and the resulting excessive enthalpy, a strong warping can take place. This is particularly applicable to the upper sheet, because from the start this sheet has a higher temperature as a result of atmospheric influences and, as is known, covers the lower sheet exactly at the position where for welding purposes, the lower sheet actually should have the same surface temperature as the upper sheet. Another disadvantage is that in particular in surface sealings of larger surfaces, for example 10.000 m² surfaces, it practically is impossible to take care of expansion compensation. Accordingly during day time under solar radiation, the sheets form irregular corrugations, which result in cracks due to the larger bending rigidity of the welding seam. By repeated expansion and contraction extensive cracks adjacent or parallel to the welding seam can develop.

THE PRESENT INVENTION

It is an object of the invention to provide a method and apparatus which will assist in overcoming the problems of existing welding methods of the type described above.

According to the invention, a method of welding together thermoplastic sheets, which are arranged in overlap fashion so that an overlap edge of one sheet, namely the overlapping sheet, lies on the other sheet, namely the overlapped sheet, is characterized thereby that a welding material in thermoplastic state is applied along a strip area, which includes a continuous area of the overlapping sheet adjacent its overlap edge, and a continuous area of the overlapped sheet adjacent the overlap edge and facing in substantially the same direction as the continuous area of the overlapping sheet, with the overlap edge of the overlapping sheet being located inbetween the longitudinal edges of the strip area.

Heat may be applied to the strip area prior to application of the welding material.

The overlap edge of the overlapping sheet may be located substantially centrally between the longitudinal edges of the strip area.

The welding material may be extruded.

The two sheets may be held together in overlapped condition prior to welding by means of a double self-adhesive strip applied to the overlapping sheet and to the overlapped sheet close to the overlap edge of the overlapping sheet. Alternatively, the two sheets may be held together in overlapped condition prior to welding by ultra-sonic spot welding at spaced distances.

The welding material may be extruded directly onto the strip area without coming into contact with air first.

The temperature of the sheets may be measured prior to applying heat.

The intensity of the heating of the strip area may be controlled in dependence on the temperature of the sheets as measured.

The welding material may be supplied in a welding bead of which the thickness is substantially equivalent to the thickness of one of the sheets.

Pressure may be applied to the welding material after having come into contact with the strip area.

The thermoplastic material may be of a colour different to that of the overlapping sheets, and, according to one suggestion, the thermoplastic material may be translucent when hardened.

Also according to the invention, an apparatus for welding together thermoplastic sheets, which are arranged in overlap fashion so that an overlap edge of one sheet, namely the overlapping sheet, lies on the other sheet, namely the overlapped sheet, is characterized thereby that a welding material application arrangement is provided, which is adapted to apply a welding material in thermoplastic state to a strip area which includes a continuous area of the overlapping sheet adjacent its overlap edge, and a continuous area of the overlapped sheet adjacent the overlap edge and facing in substantially the same direction as the continuous area of the overlapping sheet, with the overlap edge of the overlapping sheet being located inbetween the longitudinal edges of the strip area.

The apparatus may include a heating device adapted to apply heat to the strip area prior to the provision of the welding material.

The apparatus may include a roller for applying the welding material onto the strip area.

The welding material application arrangement may include an extruder.

The extruder may include an extruder channel and a contact member having a flat surface, which surface is adapted to contact the strip area, and having a recess formed in the flat surface, the recess being in communication with the extruder channel, the contact member being adapted to apply the extruded welding material onto the strip area.

The heating device may be provided in a support member, which is hinged to the welding material application arrangement so as to take up irregularities in the surface of the overlapping sheets along the strip area.

The heating device may be adapted to apply heat by radiation.

The apparatus may include a measuring device for measuring the temperature of the sheets along the strip area, which measuring device is located ahead of the heating device.

The extruder may be adapted to provide propulsion of the apparatus by the extrusion of the welding material.

The invention will now be described by way of example with reference to the accompanying schematic drawings.

In the drawings there is shown in

FIG. 1 a sectional side view of two overlapped thermoplastic sheets welded together by means of an apparatus and method in accordance with the invention;

FIG. 2 a plan view of the two overlapped sheets seen along arrow II in FIG. 1;

FIG. 3 a side view of the applicator part of one embodiment of a welding apparatus in accordance with the invention;

FIG. 4 a side view of an applicator part of a second embodiment of a welding apparatus in accordance with the invention;

FIG. 5 a view from below of the extruder applicator seen along arrow V in FIG. 4;

FIG. 6 a front view of the applicator seen along arrow VI in FIG. 4;

FIG. 7 a side view of a medium type welding apparatus in accordance with the invention;

FIG. 8 a side view of a hand welding apparatus in accordance with the invention; and FIG. 9 a side view of a heavy duty welding apparatus in accordance with the invention.

Referring to FIGS. 1 and 2, two overlapping thermoplastic sheets, namely an overlapped sheet 10 and an overlapping sheet 12 are shown to be joined together. As is shown the edge 14 of the overlapped sheet 10 extends for some distance beyond the overlap edge 16 of the overlapping sheet 12. Thereby an overlapped portion 18 is obtained.

When the two sheets are placed together prior to welding, it is necessary to ensure that no displacement of the sheets takes place prior to applying of the welding bead or strip. This can be achieved by means of a double adhesive strip 20 which is placed onto the sheet 10 to adhere thereto and thereafter the sheet 12 is pressed in overlapping fashion onto the strip 20. This should keep the two sheets in position until the necessary welding bead has been applied. It also is possible to hold the sheets together by ultra-sonic spot welding at spaced positions.

This pre-welding attachment of the sheets prevents the corrugation formation of the overlapping sheet 12 during the heating procedure, and it is avoided that, for example, wind can lift such sheets after having been placed and before welding. Also while welding takes place, no sand grains can enter into the welding seam or into the sheets from the support surfaces as a result of the action of wind and movement of the sheets.

The welding bead or strip 22 has a part 24 which adheres to the surface 26 of the sheet 10 adjacent to the overlap edge 16 of the sheet 12 but exposed to above. The welding bead 22 further has a part 28 which adheres to the part 30 of the sheet 12. The welding bead 22 should not have a thickness equivalent to at least the thickness of either the sheets 10 or 12.

The welding bead width is indicated by reference numeral 22.1 and is the sum of the widths 24 and 28. This welding bead width 22.1 defines the strip area, although heat conveniently may be applied to an area somewhat larger than the strip area. The longitudinal edges of the welding bead 22 (and thereby the strip area) are indicated by reference numerals 22.2 and 22.3 respectively.

FIGS. 1 and 2 show the end result when the welding bead 22 has been applied. One particular shape of this welding bead 22 is shown. Obviously many different forms are possible depending on the exact requirements and technical aspects involving the type of material of the sheets 10 and 12, as well as the applications to which the sheets are to be applied.

Referring to FIG. 3 an apparatus 30 is illustrated which has a heating device 32 and a welding material application arrangement in the form of an extruder nozzle 36 which opens at 38 just ahead of an applicator roller 40. The device is adapted to be moved in the direction indicated by arrow 42. Thereby the heating device 32 would heat the two sheets 10, 12 prior to the application of the welding material by the nozzle 38. The roller 40, which has a shape corresponding to the form of the bead to be applied, firmly presses the welding mass onto the two sheets.

In FIG. 4 the applicator part 44 of a welding apparatus in accordance with the invention includes a heating device 46 and an extruder 48. The extruder 48 is connected to a contact part 50, which has a flat surface 52 on its side facing the sheets. The contact part 50 has a recess 54 which is open at one end 56 and into which the channel nozzle 58 of the extruder 48 terminates. The contact part 50 may be made of any suitable plastics material.

The heating device 46 is hinged at 60 to the extruder 48 so that it can pivot in the direction indicated by arrow 62 in order to take up uneven surfaces in the sheets to be joined together. Thereby it can be ensured that the heating device is held at a constant distance from the strip area of the sheets. Thus uniform heating can be provided.

The device is adapted to be moved in the direction indicated by arrow 64 so that the sheets are first heated about the strip area and thereafter the welding material is applied by means of the extruder 48.

The size, form and width of the recess 54 defines the shape of the bead as applied.

FIG. 7 shows a medium sized apparatus 66 having handle bars 68, the controlling equipment 70, a reservoir 72 for the welding material, wheels 73, and the applicator part 74, which can be of any of the types illustrated in FIGS. 3 to 6.

In FIG. 8 a hand device 76 is illustrated having a frame 78 on which all essential parts are mounted, including the applicator part 80 and a reservoir 82 for the welding material. Hand grips 84 and 86 are provided for easy gripping of the device.

Finally, in FIG. 9 a heavy duty apparatus 88 is illustrated. Here a housing 90 houses all the essential parts and an applicator arm 92 extends therefrom with the applicator part 94 attached to it. The housing is mounted on wheels 96 and has a handle 98.

The heater device may include a radiating heater. Its height from the surface of the sheets is important because this determines the temperature of the sheets prior to application of the welding seam. The heating applied is directly proportional to the voltage so that the heating can be controlled in a simple manner by known arrangements. The heating can be rendered dependent of weather conditions. It has to be noted that heating is applied by radiation and not conductance due to the special arrangement of the heating device. The heating therefore takes place as a shock type surface heating process, which, due to its speed and brief effect, avoids a thorough heating of both sheets, but plastifies only the direct upper molecular layer before the relevant heat conductance can take place to below and before the welding bead is placed into position.

In particular where the welding seams are covered subsequently in order to be protected against ambient influences, the welding seams may be produced of thermoplastics in natural colours. For example in the case of polyolefines such natural colour is milky white (being translucent), and during the welding procedure the material is glass clear and thus an inspection or control of the welding seam can be conducted visually, in particular regarding inclusions, air bubbles, cavities or voids, etc. Such inspection or control was not possible with existing welding methods.

I claim:

1. A welding method comprising the steps of providing a pair of thermoplastic sheets each including opposite surfaces bridged by a terminal edge defining an edge portion, placing the edge portion of a first overlapping of the pair of sheets into overlapping relationship with the edge portion of a second overlapped of the pair of sheets and with the terminal edges thereof spaced a predetermined distance from each other and in generally parallel relationship to each other, applying a continuous linear strip of plastic welding material in thermoplastic state progressively and in generally parallel relationship to said terminal edges along a first of the opposite surfaces of the overlapping edge portion and a first of the opposite surfaces of the overlapped edge portion adjacent to the terminal edge of the overlapping edge portion and in bridging relationship thereto and with the terminal edge of the overlapping edge portion and being disposed between opposite terminal edges of the continuous linear strip of welding material, performing the overlapping of the overlapping and overlapped edge portions in the absence of overlapping any portion of the overlapping first sheet upon itself and in the absence of overlapping any portion of the overlapped second sheet upon itself, and securing the second surfaces of the overlapping and overlapped edge portions to each other prior to applying the strip of plastic welding material by sandwiching therebetween a strip of pressure sensitive adhesive.

2. A welding method comprising the steps of providing a pair of thermoplastic sheets each including opposite surfaces bridged by a terminal edge defining an edge portion, placing the edge portion of a first overlapping of the pair of sheets into overlapping relationship with the edge portion of a second overlapped of the pair of sheets and with the terminal edges thereof spaced a predetermined distance from each other and in generally parallel relationship to each other, applying a continuous linear strip of plastic welding material in thermoplastic state progressively and in generally parallel relationship to said terminal edges along a first of the opposite surfaces of the overlapping edge portion and a first of the opposite surfaces of the overlapped edge portion adjacent to the terminal edge of the overlapping edge portion and in bridging relationship thereto and with the terminal edge of the overlapping edge portion being disposed between opposite terminal edges of the continuous linear strip of welding material, performing the overlapping of the overlapping and overlapped edge portions in the absence of overlapping any portion of the overlapping first sheet upon itself and in the absence of overlapping any portion of the overlapped second sheet upon itself, and securing the second surfaces of the overlapping and overlapped edge portions to each other prior to applying the strip of plastic welding material by sandwiching therebetween a strip of double faced adhesive.

3. A welding method comprising the steps of providing a pair of thermoplastic sheets each including opposite surfaces bridged by a terminal edge defining an edge portion, placing the edge portion of a first overlapping of the pair of sheets into overlapping relationship with the edge portion of a second overlapped of the pair of sheets and with the terminal edges thereof spaced a predetermined distance from each other and in generally parallel relationship to each other, applying a continuous linear strip of plastic welding material in thermoplastic state progressively and in generally parallel relationship to said terminal edges along a first of the opposite surfaces of the overlapping edge portion and a first of the opposite surfaces of the overlapped edge portion adjacent to the terminal edge of the overlapping edge portion and in bridging relationship thereto and with the terminal edge of the overlapping edge portion being disposed between opposite terminal edges of the continuous linear strip of welding material, performing the overlapping of the overlapping and overlapped edge portions in the absence of overlapping any portion of the overlapping first sheet upon itself and in the absence of overlapping any portion of the overlapped second sheet upon itself, and applying heat to the first opposite surfaces of the overlapped and overlapping edge portions prior to the application of the plastic welding material thereto.

4. The welding method as defined in claim 3 including the step of securing the second surfaces of the overlapping and overlapped edge portions to each other prior to applying the strip of plastic welding material.

5. The welding method as defined in claim 3 including the step of spot welding the second surfaces of the overlapping and overlapped edge portions to each other prior to applying the strip of plastic welding material.

6. The welding method as defined in claim 3 including the step of securing the second surfaces of the overlapping and overlapped edge portions to each other prior to applying the strip of plastic welding material by sandwiching therebetween a strip of adhesive.

7. The welding method as defined in claim 3 wherein the application of the plastic welding material is performed by extruding.

8. The welding method as defined in claim 3 including the step of applying pressure to the plastic welding material after the same has been applied to the first opposite surfaces of the overlapped and overlapping edge portions.

9. The welding method as defined in claim 5 wherein the step of spot welding is performed by ultra-sonic spot welding.

10. The welding method as defined in claim 3 wherein the application of the plastic welding material is performed by extruding, and pressure is applied to the plastic welding material after the application thereof to the first opposite surfaces of the overlapped and overlapping edge portions.

11. A welding method comprising the steps of providing a pair of thermoplastic sheets each including opposite surfaces bridged by a terminal edge defining an edge portion, placing the edge portion of a first overlapping of the pair of sheets into overlapping relationship with the edge portion of a second overlapped of the pair of sheets and with the terminal edges thereof spaced a predetermined distance from each other and in generally parallel relationship to each other, applying a continuous linear strip of plastic welding material in thermoplastic state progressively and in generally parallel relationship to said terminal edges along a first of the opposite surfaces of the overlapping edge portion and a first of the opposite surfaces of the overlapped edge portion adjacent to the terminal edge of the overlapping edge portion and in bridging relationship thereto and with the terminal edge of the overlapping edge portion being disposed between opposite terminal edges of the continuous linear strip of welding material, performing the overlapping of the overlapping and overlapped edge portions in the absence of overlapping any portion of the overlapping first sheet upon itself and in the absence of overlapping any portion of the overlapped second sheet upon itself, and spot welding the second surfaces of the overlapping and overlapped edge portions to each other prior to applying the strip of plastic welding material.

12. The welding method as defined in claim 11 wherein the spot welding is along a plurality of spaced points.

13. The welding method as defined in claim 11 including the step of securing the second surfaces of the overlapping and overlapped edge portions to each other prior to applying the strip of plastic welding material by sandwiching therebetween a strip of pressure sensitive adhesive.

14. The welding method as defined in claim 11 including the step of securing the second surfaces of the overlapping and overlapped edge portions to each other prior to applying the strip of plastic welding material by sandwiching therebetween a strip of double faced adhesive.

15. The welding method as defined in claim 11 including the step of applying heat to the first opposite surfaces of the overlapped and overlapping edge portions prior to the application of the plastic welding material thereto.

16. The welding method as defined in claim 13 including the step of spot welding the second surfaces of the overlapping and overlapped edge portions to each other prior to applying the strip of plastic welding material.

17. The welding method as defined in claim 14 including the step of spot welding the second surfaces of the overlapping and overlapped edge portions to each other prior to applying the strip of plastic welding material.

18. The welding method as defined in claim 15 including the step of spot welding the second surfaces of the overlapping and overlapped edge portions to each other prior to applying the strip of plastic welding material.

* * * * *